US012719925B2

(12) United States Patent
Gupta et al.

(10) Patent No.: US 12,719,925 B2
(45) Date of Patent: Aug. 25, 2026

(54) METHOD AND SYSTEM FOR SECURING LARGE LANGUAGE MODEL SERVICES AGAINST PRIVACY ATTACKS

(71) Applicant: JPMorgan Chase Bank, N.A., New York, NY (US)

(72) Inventors: Ankur Gupta, Bengaluru (IN); Archana Ramesh, Bengaluru (IN); Smitha Ganesh, Bangalore (IN); Eric R Alspaugh, Lancaster, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 105 days.

(21) Appl. No.: 18/672,939

(22) Filed: May 23, 2024

(65) Prior Publication Data

US 2025/0317474 A1 Oct. 9, 2025

(30) Foreign Application Priority Data

Apr. 9, 2024 (IN) ............................ 202411028877

(51) Int. Cl.
*H04L 9/40* (2022.01)

(52) U.S. Cl.
CPC ................................ *H04L 63/1466* (2013.01)

(58) Field of Classification Search
CPC .................................................. H04L 63/1466
See application file for complete search history.

(56) References Cited

U.S. PATENT DOCUMENTS 12,073,930 B1 * 8/2024 Alperin .................. G06N 20/10
2019/0286832 A1 * 9/2019 Szeto .................. H04W 12/082
2020/0074105 A1 * 3/2020 Gordon ............... G06F 21/6209
2025/0078823 A1 * 3/2025 Fan ......................... G10L 15/22
2025/0111092 A1 * 4/2025 Mantin ................... G06F 40/20

* cited by examiner

*Primary Examiner* — Vance M Little
(74) *Attorney, Agent, or Firm* — Greenblum & Bernstein, P.L.C.

(57) ABSTRACT

A system for securing a large language model (LLM) service against LLM privacy attacks. The system may comprise a processor that executes instructions that cause the processor to: interface with each output of the LLM service and each client network of the LLM service; monitor each output of the LLM to detect at least one client query textual response; detect and redact the at least one client query textual response according to an evaluation of that response and at least one current client privilege level that is assigned to at least one target client network account to which the at least one client query textual response is directed; and transmit a result of the redacting to a client device of the at least one target client network account.

20 Claims, 4 Drawing Sheets

METHOD AND SYSTEM FOR SECURING LARGE LANGUAGE MODEL SERVICES AGAINST PRIVACY ATTACKS

CROSS-REFERENCE TO RELATED APPLICATIONS

This application claims priority benefit from Indian Application No. 202411028877, filed Apr. 9, 2024, which is hereby incorporated by reference in its entirety.

BACKGROUND

1. Field of the Invention

The field of the invention disclosed herein generally relates to a system for protecting large language model (LLM) services from privacy attacks and, more particularly, to a method, system, and computer-readable storage medium for implementing technology that provides LLM services with an additional layer of security that is not resource-intensive but nonetheless comprehensively protects their content against hallucinations, toxic content, irrelevant information, and privacy attacks from client networks of the LLM services.

2. Background of the Invention

In the growing technological field of artificial intelligence and machine learning (AI/ML), its models are designed to acquire new knowledge by "learning" new information, which can include large amounts of private data that make such AI/ML models prime candidates for privacy attacks.

Unfortunately, even if trained to generate data in a manner that complies with existing confidentiality requirements (e.g., privacy laws and/or regulations, employment relationships, customer service and/or software user agreements, etc.), there is currently no easy way available to retrain an AI/ML model to effectively "forget" some of its acquired knowledge in response to a change in such requirements (e.g., a confidentiality requirement change, a compliance issue, the termination of an application, customer, employee and/or service, etc.).

In addition, since its introduction into this growing technological field, generative pre-trained transformer (GPT) technology (commonly referred to as "generative AI") has received widespread attention from both users and developers alike. However, GPT technology has also garnered a great deal of attention from hackers due to the access that it provides to vast amounts of information that could be confidential in nature and thus may be maliciously exploited in ways that seriously impact individual(s) and/or organization(s) to which such information pertains.

Accordingly, there is a need in the field of the herein-disclosed invention to safeguard AI/ML models from privacy attacks by making them forget certain confidential information in order to safeguard such information from unwanted disclosure. However, this approach has drawbacks because: retraining an existing AI/ML model on an updated set of training data can negatively impact that model's performance and limit the amount of information that the model may unlearn. In addition, it is not only impractical but would also require a great deal of resources to retrain an AI/ML model each time that its confidentiality requirements change.

Moreover, even if an AI/ML model actually is successfully retrained to unlearn certain information, that model may still remain susceptible to privacy attacks that query "unlearnt" information indirectly or within a context that is different from that of the dataset utilized to retrain the model. For example, rather than asking an AI/ML model "where a particular person was born," a user may instead ask that model "where the person went to school" or "where their sibling was born" in order to sidestep protections against direct privacy attacks by indirectly eliciting protected information from the AI/ML model.

Furthermore, relatively recent advances in AI/ML technology also make it possible for hackers to develop an AI/ML model that: (1) probes another model for vulnerabilities, such as the vulnerabilities mentioned above; and (2) generates queries that are designed to obtain private information from the other model by sidestepping its security measures in order to exploit the vulnerabilities that currently exist within this technological field.

To be specific, the above approach of training an AI/ML model to unlearn or forget confidential information or information that has been changed, is also disadvantageous because this approach can reduce performance by up to 2% and because the AI/ML model may nevertheless "remember" the unlearnt or forgotten information over time.

Therefore, there is a need in the field of the herein-disclosed invention for a technical solution to the foregoing limitations in AI/ML technology.

SUMMARY

The present disclosure, through one or more of its various aspects, embodiments, and/or specific features or sub-component, provides, inter alia, various systems, servers, devices, methods, media, programs and platforms for securing a large language model (LLM) service against LLM privacy attacks by providing the LLM service with an additional layer of security that is not resource-intensive but nonetheless comprehensively protects the LLM service's content against hallucinations, toxic content, irrelevant information, and privacy attacks from client networks of the LLM service.

According to an aspect of the present disclosure, a method is provided for securing a large language model (LLM) service against LLM privacy attacks. The method may comprise: interfacing a processor with, and as an intermediary between, each output of the LLM service and each client network of the LLM service; monitoring, via the processor, each output of the LLM to detect at least one client query textual response; detecting, by the processor, the at least one client query textual response from at least one output of the LLM service; determining, via the processor, at least one target client network account to which the at least one client query textual response is directed; obtaining, via the processor, at least one current client privilege level that is assigned to the at least one target client network account; evaluating, via the processor, the at least one client query textual response against a data sensitivity taxonomy to determine whether the at least one client query textual response includes a set of sensitive information; redacting, via the processor, the at least one client query textual response according to a result of the evaluating and the at least one current client privilege level; and transmitting, by the processor, a result of the redacting to at least one client device that has been associated with the at least one target client network account. Each output of the LLM service that provides textual responses to client queries.

In the method, the determining the at least one target client network account may comprise analyzing, via the processor, the at least one client query textual response to identify at least one respective indication of the at least one target client network account; comparing, by the processor, the at least one respective indication against a corresponding index of client network accounts; and respectively matching, via the processor and based on the comparing, the at least one respective indication with the at least one target client network account. The at least one respective indication may comprise at least one from among a client network account identifier, a token of a client network account, and a client network address.

In the method, the obtaining may comprise: searching, by the processor, a client network account privilege repository for at least one entry that corresponds to the at least one target client network account; locating, via the processor and within the client network account privilege repository, the at least one entry; and identifying, via the processor, the at least one current client privilege level from the at least one entry.

In the method, the at least one current client privilege level may comprise at least one corresponding set of entitlements that permit clients to receive sensitive information that have a degree of sensitivity that is identified by the at least one corresponding set of entitlements.

In the method, the evaluating may comprise: utilizing, by the processor, an artificial intelligence and machine learning (AI/ML) model to determine whether the at least one client query textual response includes the set of sensitive information. Various types of sensitive data may have been utilized to train the AI/ML model to identify, classify, and score the sensitive data.

In the method, the data sensitivity taxonomy may have been generated by the AI/ML model as a set of classifications of the various types of sensitive data on which the AI/ML model has been trained.

In the method, the redacting may comprise utilizing, by the processor, the AI/ML model to generate the result of the redacting.

In the method, the result of the evaluating may comprise at least one from among an identification of the set of sensitive information, a set of respectively corresponding locations of the sensitive information, and a set of respectively corresponding sensitivities.

In the method, the redacting may comprise: utilizing, by the processor, the result of the evaluating, and the at least one current client privilege level, to determine at least one redaction to be made to the at least one client query textual response; and making, by the processor, the least one redaction to the at least one client query textual response.

In the method, the making may comprise performing, via the processor, at least one from among data augmentation, attribute suppression, token masking, pseudonymization, generalization, swapping, data perturbation, synthetic data generation, data aggregation, and add random noise.

According to another aspect of the present disclosure, a system is provided for securing a large language model (LLM) service against LLM privacy attacks. The system may comprise a processor and memory that stores instructions that, when executed by the processor, cause the processor to perform operations that may include: interfacing with, and as an intermediary between, each output of the LLM service and each client network of the LLM service; monitoring each output of the LLM to detect at least one client query textual response; detecting the at least one client query textual response from at least one output of the LLM service; determining at least one target client network account to which the at least one client query textual response is directed; obtaining at least one current client privilege level that is assigned to the at least one target client network account; evaluating the at least one client query textual response against a data sensitivity taxonomy to determine whether the at least one client query textual response includes a set of sensitive information; redacting the at least one client query textual response according to a result of the evaluating and the at least one current client privilege level; and transmitting a result of the redacting to at least one client device that has been associated with the at least one target client network account. Each output of the LLM service may provide textual responses to client queries.

In the system, when the instructions are executed by the processor, the determining the at least one target client network account may comprise: analyzing the at least one client query textual response to identify at least one respective indication of the at least one target client network account; comparing the at least one respective indication against a corresponding index of client network accounts; and respectively matching, based on the comparing, the at least one respective indication with the at least one target client network account. The at least one respective indication may comprise at least one from among a client network account identifier, a token of a client network account, and a client network address.

In the system, when the instructions are executed by the processor, the obtaining may comprise searching a client network account privilege repository for at least one entry that corresponds to the at least one target client network account; locating within the client network account privilege repository, the at least one entry; and identifying the at least one current client privilege level from the at least one entry.

In the system, when the instructions are executed by the processor, the at least one current client privilege level may comprise at least one corresponding set of entitlements that permit clients to receive sensitive information that have a degree of sensitivity that is identified by the at least one corresponding set of entitlements.

In the system, when the instructions are executed by the processor, the evaluating may comprise: utilizing an AI/ML model to determine whether the at least one client query textual response includes the set of sensitive information. Various types of sensitive data have been utilized to train the AI/ML model to identify, classify, and score the sensitive data.

In the system, the data sensitivity taxonomy may have been generated by the AI/ML model as a set of classifications of the various types of sensitive data on which the AI/ML model has been trained.

In the system, when the instructions are executed by the processor, the redacting may comprise utilizing the AI/ML model to generate the result of the redacting.

In the system, when the instructions are executed by the processor, the result of the evaluating may comprise at least one from among an identification of the set of sensitive information, a set of respectively corresponding locations of the sensitive information, and a set of respectively corresponding sensitivities.

In the system, when the instructions are executed by the processor, the redacting may comprise: utilizing the result of the evaluating, and the at least one current client privilege level, to determine at least one redaction to be made to the at least one client query textual response; and making the least one redaction to the at least one client query textual response.

In the system, when the instructions are executed by the processor, the making may comprise performing at least one from among data augmentation, attribute suppression, token masking, pseudonymization, generalization, swapping, data perturbation, synthetic data generation, data aggregation, and add random noise.

According to yet another aspect of the present disclosure, a non-transitory computer-readable medium is provided for securing a large language model (LLM) service against LLM privacy attacks. The computer-readable medium comprises instructions that, when executed by a processor, cause the processor to perform operations that may include: interfacing with, and as an intermediary between, each output of the LLM service and each client network of the LLM service; monitoring each output of the LLM to detect at least one client query textual response; detecting the at least one client query textual response from at least one output of the LLM service; determining at least one target client network account to which the at least one client query textual response is directed; obtaining at least one current client privilege level that is assigned to the at least one target client network account; evaluating the at least one client query textual response against a data sensitivity taxonomy to determine whether the at least one client query textual response includes a set of sensitive information; redacting the at least one client query textual response according to a result of the evaluating and the at least one current client privilege level; and transmitting a result of the redacting to at least one client device that has been associated with the at least one target client network account. Each output of the LLM service may provide textual responses to client queries.

In the computer-readable medium, when the instructions are executed by the processor, the determining the at least one target client network account may comprise: analyzing the at least one client query textual response to identify at least one respective indication of the at least one target client network account; comparing the at least one respective indication against a corresponding index of client network accounts; and respectively matching, based on the comparing, the at least one respective indication with the at least one target client network account. The at least one respective indication may comprise at least one from among a client network account identifier, a token of a client network account, and a client network address.

In the computer-readable medium, when the instructions are executed by the processor, the obtaining may comprise: searching a client network account privilege repository for at least one entry that corresponds to the at least one target client network account; locating within the client network account privilege repository, the at least one entry; and identifying the at least one current client privilege level from the at least one entry.

In the computer-readable medium, when the instructions are executed by the processor, the at least one current client privilege level may comprise at least one corresponding set of entitlements that permit clients to receive sensitive information that have a degree of sensitivity that is identified by the at least one corresponding set of entitlements.

In the computer-readable medium, when the instructions are executed by the processor, the evaluating may comprise: utilizing an AI/ML model to determine whether the at least one client query textual response includes the set of sensitive information. Various types of sensitive data may have been utilized to train the AI/ML model to identify, classify, and score the sensitive data.

In the computer-readable medium, the data sensitivity taxonomy may have been generated by the AI/ML model as a set of classifications of the various types of sensitive data on which the AI/ML model has been trained.

In the computer-readable medium, when the instructions are executed by the processor, the redacting may comprise utilizing the AI/ML model to generate the result of the redacting.

In the computer-readable medium, when the instructions are executed by the processor, the result of the evaluating may comprise at least one from among an identification of the set of sensitive information, a set of respectively corresponding locations of the sensitive information, and a set of respectively corresponding sensitivities.

In the computer-readable medium, when the instructions are executed by the processor, the redacting may comprise: utilizing the result of the evaluating, and the at least one current client privilege level, to determine at least one redaction to be made to the at least one client query textual response; and making the least one redaction to the at least one client query textual response.

In the computer-readable medium, when the instructions are executed by the processor, the making may comprise performing at least one from among data augmentation, attribute suppression, token masking, pseudonymization, generalization, swapping, data perturbation, synthetic data generation, data aggregation, and add random noise.

Thereby, the invention disclosed herein improves existing technology by providing an LLM service with an additional layer of security that is not resource-intensive but nonetheless comprehensively protects content of the LLM service against hallucinations, toxic content, irrelevant information, and privacy attacks from client networks of the LLM service.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
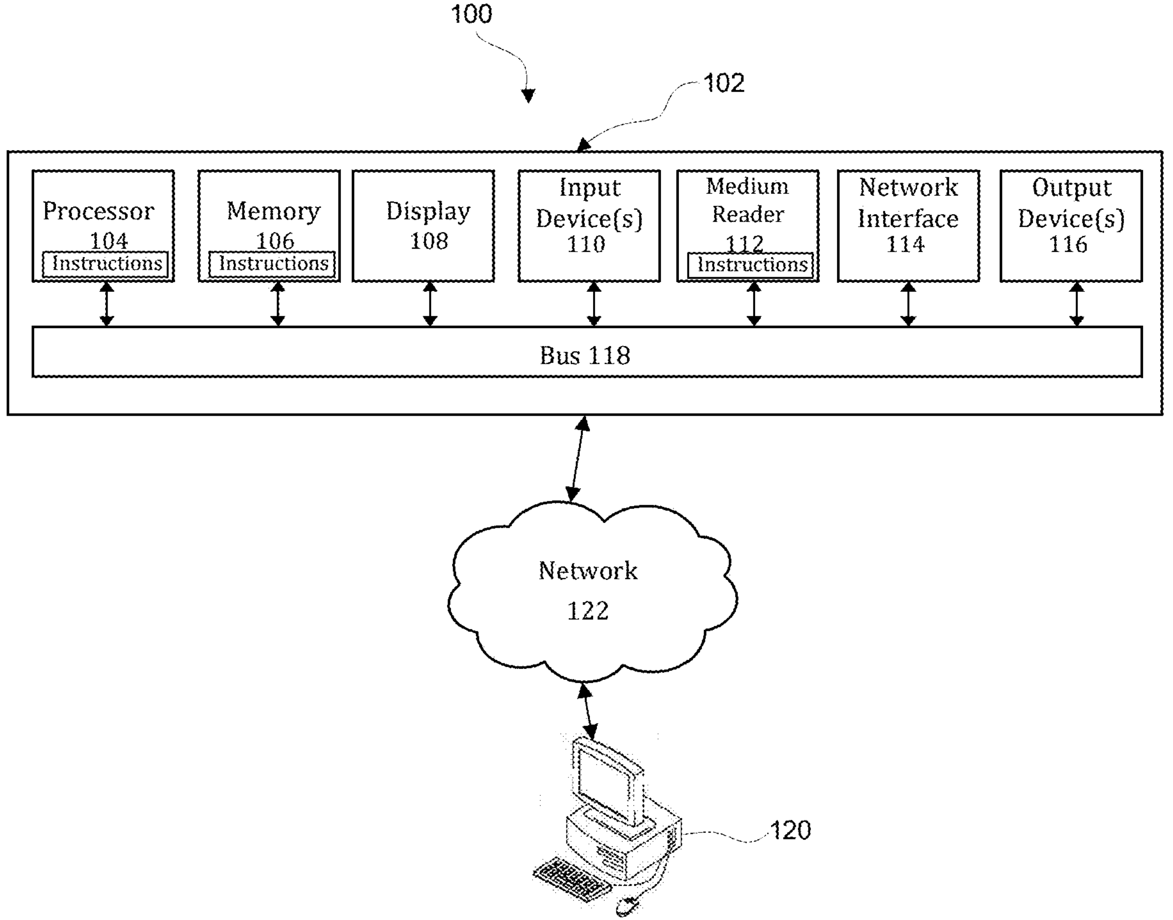
FIG. 1 is a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a LLM privacy protection tool that manages access to resources of a network.

Figure 2:
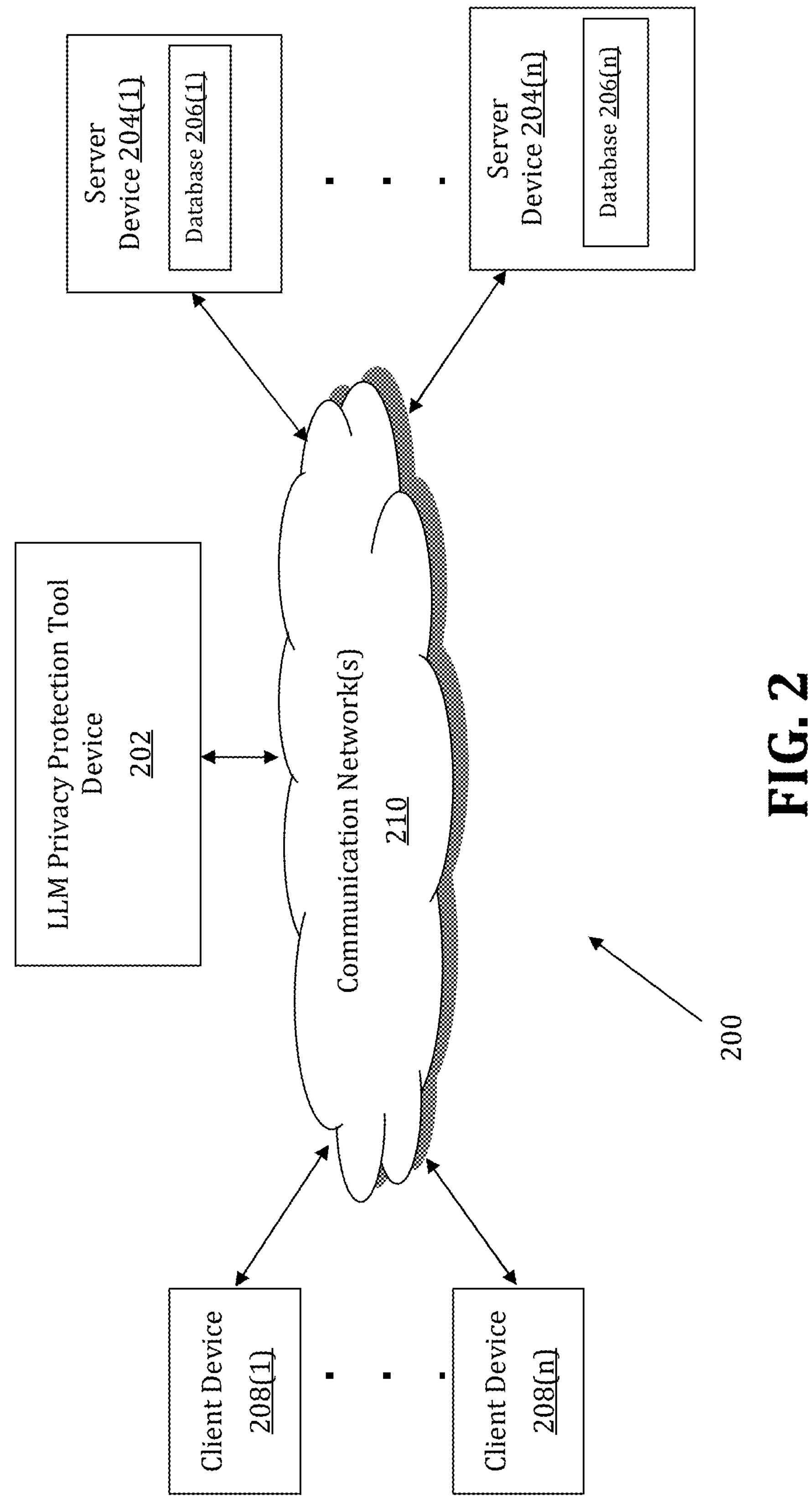
FIG. 2 is a diagram of an exemplary network environment for a LLM privacy protection tool that protects content from LLM services against privacy attacks.

Referring to FIG. 2, a schematic of an exemplary network environment 200 for a LLM privacy protection tool that secures information within an LLM service against privacy attacks, is illustrated. In an exemplary embodiment, a LLM privacy protection tool may be implemented on any networked computer platform, such as, for example, a personal computer (PC).

A method for implementing technology that secures information within an LLM service against privacy attacks, may be implemented by an LLM Privacy Protection Tool (LPPT) device 202. The LPPT device 202 may be the same or similar to the computer system 102 as described with respect to FIG. 1. The LPPT device 202 may be a rack-mounted server in a datacenter, an embedded microcontroller (MCU) in an electronic device, or another type of headless system, which is a computer system or device that is configured to operate without a monitor, keyboard and mouse. The LPPT device 202 may store one or more applications that can include executable instructions that, when executed by the LPPT device 202, cause the LPPT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LPPT device 202 itself, may be located in virtual server(s) running in a cloud-based computing environment rather than being tied to one or more specific physical network computing devices. Also, the application(s) may be running in one or more virtual machines (VMs) executing on the LPPT device 202. Additionally, in one or more embodiments of this technology, virtual machine(s) running on the LPPT device 202 may be managed or supervised by a hypervisor.

In the network environment 200 of FIG. 2, the LPPT device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the LPPT device 202, such as the network interface 114 of the computer system 102 of FIG. 1, operatively couples and communicates between the LPPT device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LPPT device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, computer readable media, and LPPT devices that implement an LLM privacy protection tool that protects the information of a server, such as server device 204(1), against privacy attacks from its client networks. In an exemplary embodiment, the server device(s) may comprise at least one LLM service that is based on GPT technology.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LPPT device 202 may be a standalone device or integrated with one or more other devices or apparatuses, such as one or more of the server devices 204(1)-204(*n*), for example. In one particular example, the LPPT device 202 may include or be hosted by one of the server devices 204(1)-204(*n*), and other arrangements are also possible. As another example, the LPPT device 202 may be integrated with one or more other devices or apparatuses, such as one or more of the client devices 208(1)-208(*n*). Moreover, one or more of the devices of the LPPT device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the LPPT device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store data that relates to a variety of databases.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the LPPT device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the LPPT device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the LPPT device 202, the server devices 204(1)-204(*n*), the databases 206(1)-206(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LPPT device 202, the server devices 204(1)-204(*n*), the databases 206(1)-206(*n*), or the client devices 208(1)-208(*n*), for example, may be configured to operate as virtual instances on the same physical machine. In other words, one or more of the LPPT device 202, the server devices 204(1)-204(*n*), the databases 206(1)-206(*n*), or the client devices 208(1)-208(*n*) may operate on the same physical device rather than as separate devices communicating through communication network(s) 210. Additionally, there may be more or fewer LPPT devices 202, server devices 204(1)-204(*n*), databases 206(1)-206(*n*), or client devices 208(1)-208(*n*) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
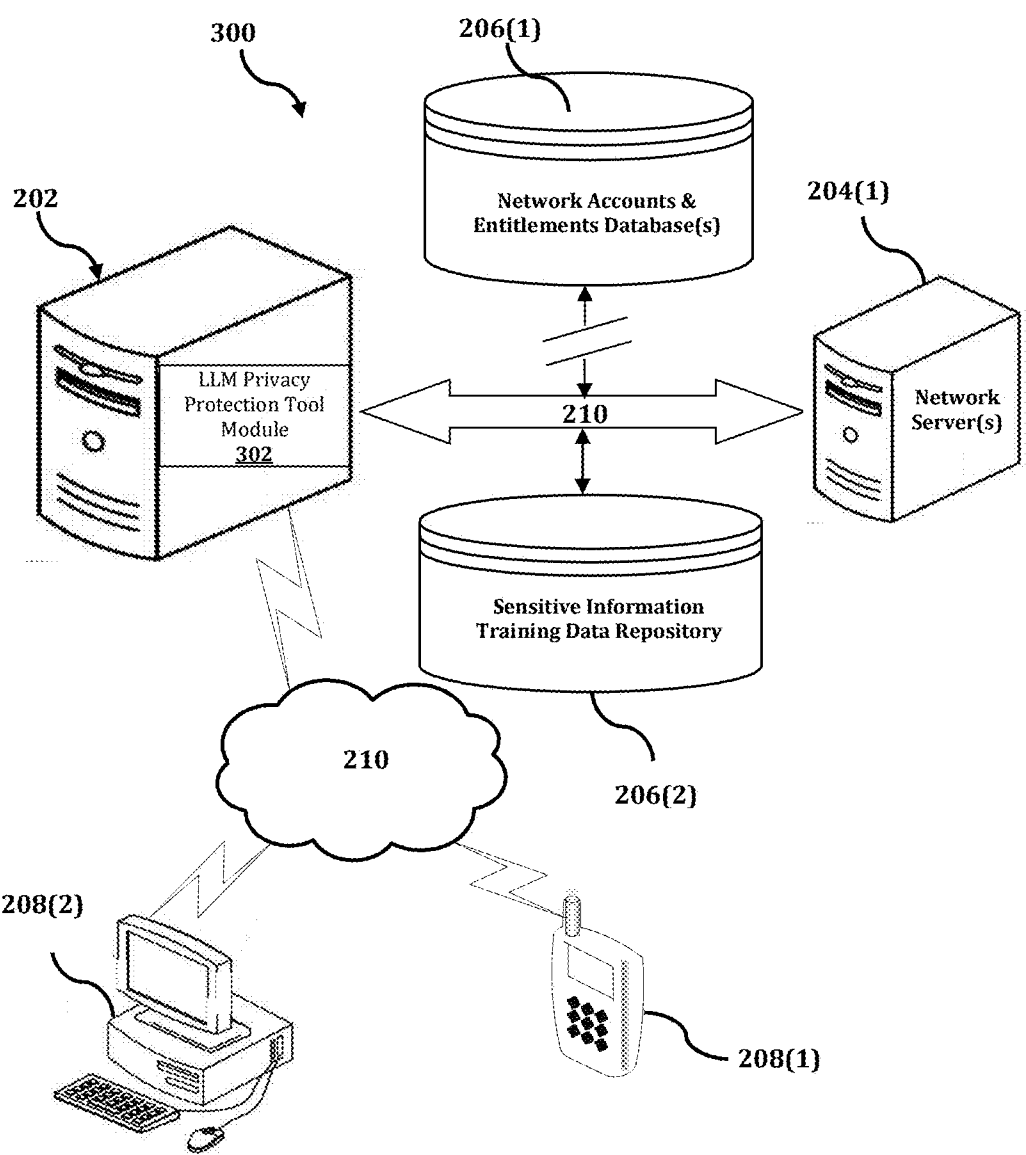
FIG. 3 is a diagram of an exemplary perspective of a network environment that utilizes a LLM privacy protection tool to protect content from LLM services against privacy attacks.

The LPPT device 202 is described and illustrated in FIG. 3 as including LLM privacy protection tool module 302, although it may include other rules, policies, modules, databases, or applications, for example. As will be described below, LLM privacy protection tool module 302 is configured to secure information within an LLM service against privacy attacks. LLM privacy protection tool module 302 may include software that is based on a microservices architecture.

LLM privacy protection tool module 302 may be integrated with one or more devices or apparatuses, such as client devices 208(1)-208(*n*), where LLM privacy protection tool module 302 may be implemented as an application or as an addon or plugin to another application of the one or more devices or apparatuses, and where LLM privacy protection tool module 302 may execute in the background.

An exemplary process 300 for application of an LLM privacy protection tool to an aspect of the network environment of FIG. 2 is illustrated as being executed in FIG. 3. Specifically, a first client device 208(1) and a second client device 208(2) are illustrated as being in communication with LPPT device 202. In this regard, the first client device 208(1) and the second client device 208(2) may be "clients" of the LPPT device 202 and are described herein as such. Nevertheless, it is to be known and understood that the first client device 208(1) and/or the second client device 208(2) need not necessarily be "clients" of the LPPT device 202, or any entity described in association therewith herein. Any additional or alternative relationship may exist between either or both of first client device 208(1), second client device 208(2) and LPPT device 202, or no relationship may exist.

Further, LPPT device 202 is illustrated as being able to access network accounts & entitlements database(s) 206(1), and sensitive information training data repository 206(2). LPPT device 202 may comprise an LLM privacy protection tool that communicates with network accounts & entitlements database(s) 206(1). In addition, the LLM privacy protection tool of LPPT device 202 may also communicate with sensitive information training data repository 206(2). LLM privacy protection tool module 302 may be configured to access these databases in order to determine entitlement(s). For example, LPPT device 202 may determine an entitlement level based on learned knowledge, and LPPT device 202 may utilize the entitlement level to redact an LLM's output.

In an embodiment, LPPT device 202 may determine an entitlement level based on one or more entitlement databases, such as network accounts & entitlements database(s) 206(1), for example. In the embodiment, to determine the entitlement level, LPPT device 202 may rely on automated learning that utilizes information, such as employee organization, location, country, office location, tools, applications, etc. In such an embodiment, LPPT device 202 may identify querying entities by "learning" (or acquiring) available information and leveraging that information to determine entitlement levels. However, it should be noted that this solution may be extended beyond the domain of resiliency and expanded to cover all contexts.

To determine an entitlement level, LPPT device 202 may utilize various information feeds to identify a querying entity, the querying entity's role or job title, the querying entity's place in a hierarchy, systems to which the querying entity has access, the querying entity's officer title, and other information that helps an aggregator component of LPPT device 202 pass such identified information into a classifier component of LPPT device 202 to determine the contextual level of detail to provide within a response.

Thereby monitoring whether querying entities' attributes meet necessary criteria, helps prevent unauthorized access because there will be no context to provide an answer via the classifier when a querying entity does not meet any of the necessary criteria. This not only provides a specific case of a privacy attack, but actually an entire range of responses based on dynamically calculated entitlements against the aggregator for the necessary redaction or content moderation. The aggregator may combine any determined entitlement information with any corresponding information that has been identified, then the aggregator may utilize the combined information to apply context-based redaction.

When determining entitlements, LPPT device 202 may generate an implicit dataset (entitlement level, query) that may be utilized to identify any set of anomalous user behaviors or an anomalous query based on the entitlement(s) of the corresponding entity/entities. This may begin with a creation of a database of allowable queries at the entitlement level, and the database may be updated with new queries entered by their querying entity/entities. Underlying datasets may be utilized to identify malicious intent.

Moreover, LPPT device 202 may receive and transmit data via communication network(s) 210. LPPT device 202 may receive and transmit data such as code that is written in one or more of the following dialects: transaction control language (TCL), data manipulation language (DML), data control language (DCL) and data definition language (DFL). Additionally, via communication network(s) 210, LPPT device 202 may respectively receive and transmit data from and to one or more of the following devices: network server(s) 204(1), network accounts & entitlements database(s) 206(1), sensitive information training data repository 206(2), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(*n*) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the LPPT device 202 via broadband or cellular communication. Of course, these embodiments are merely exemplary and are not limiting or exhaustive.

LLM privacy protection tool module 302 may execute a process for securing the information of at least one server device, such as server devices 204(1)-204(*n*), against privacy attacks from its client network(s) (e.g., communication network(s) 210) and/or client device(s) (e.g., client devices 208(1)-208(*n*)). In an embodiment, the at least one server may comprise an LLM service. An exemplary process for securing information of the at least one server is generally indicated at flowchart 400 in FIG. 4.

Figure 4:
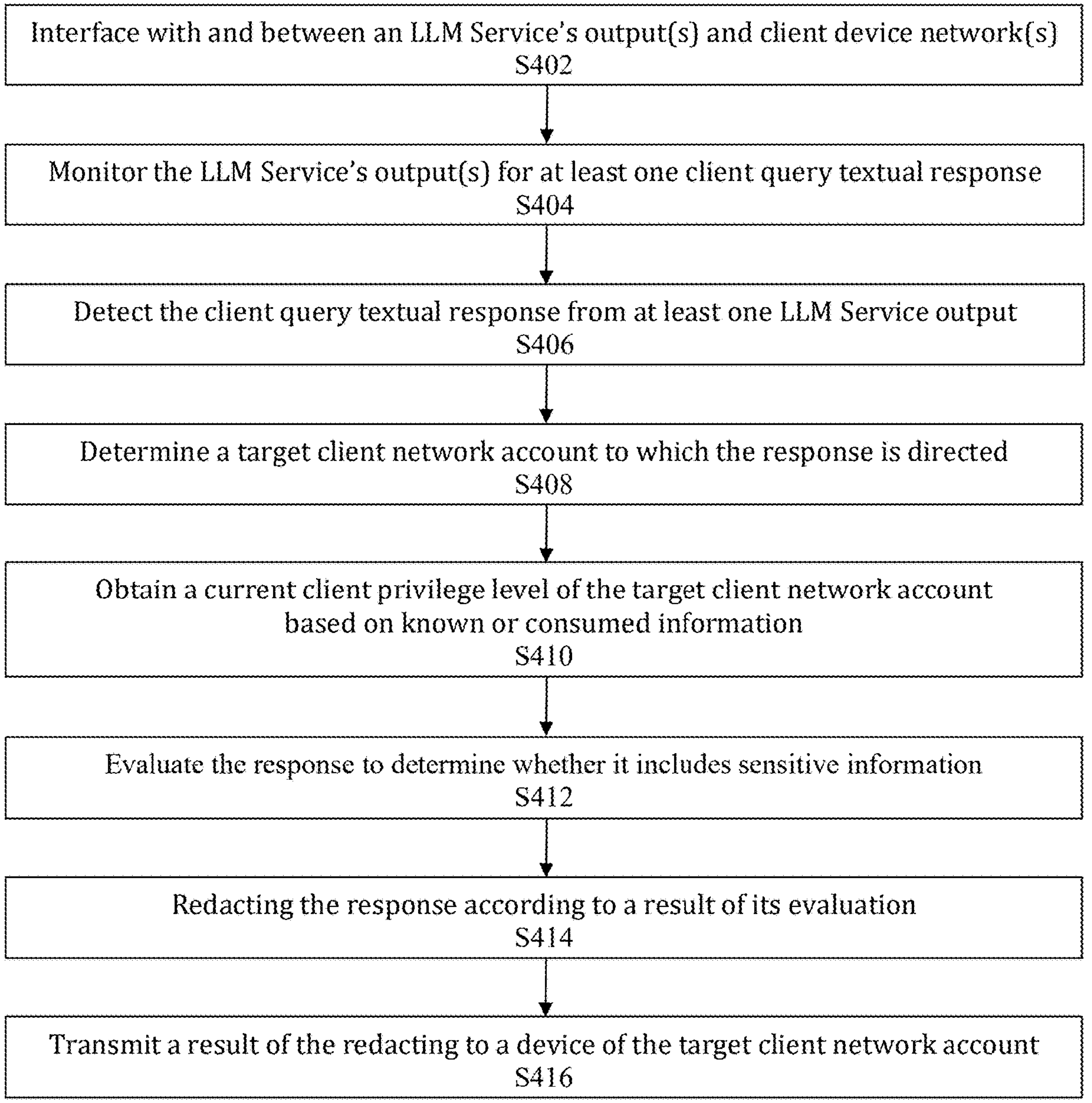
FIG. 4 is a flowchart of an exemplary process for securing at least one LLM service against privacy attacks.

In process 400 of FIG. 4, at step S402, LLM privacy protection tool module 302 is interfaced with and between at least one LLM service's output(s) and at least one of its client device network(s). At step S402, LLM privacy protection tool module 302 is interfaced with and between the at least one LLM service's output(s) and the at least one of its client device network(s), such that LLM privacy protection tool module 302 acts as an intermediary between the at least one LLM service and the at least one of its client device network(s).

As disclosed herein, the at least one LLM service's output(s) provide(s) textual responses to client queries. Although step S402 may be performed by LLM privacy protection tool module 302, LLM privacy protection tool module 302 may also be designed to merely be an object of step S402 and its interface function. In an embodiment, the at least one LLM service may be hosted on at least one server, such as server devices 204(1)-204(*n*), respectively, and the at least one LLM service's at least one client device network(s) may comprise communication network(s) 210 and client devices 208(1)-208(*n*).

At step S404, LLM privacy protection tool module 302 monitors the at least one LLM service's output(s) for at least one client query textual response from an output of the at least one LLM service. Although step S404 may be performed continuously, step S404 may also include buffering the at least one LLM service's output(s) when at least one connection is lost between the at least one LLM service's output(s) and LLM privacy protection tool module 302.

At step S406, LLM privacy protection tool module 302 detects the at least one client query textual response from at least one output of the at least one LLM service. As disclosed herein, the at least one client query textual response is output by the at least one LLM service in response to receiving at least one client query from at least one client of the at least one LLM service.

At step S408, LLM privacy protection tool module 302 determines at least one target client network account to which the at least one client query textual response is directed. In an embodiment, LLM privacy protection tool module 302 may perform step S408 by analyzing the at least one client query textual response in order to identify at least one respective indication of the at least one target client network account.

In the embodiment, the at least one respective indication may comprise at least one from among a client network account identifier, a token of a client network account, and a client network address. Also, in the embodiment, step S408 may additionally include comparing the at least one respective indication against a corresponding index of client network accounts and, based on this comparison, respectively matching the at least one respective indication with the at least one target client network account.

At step S410, LLM privacy protection tool module 302 obtains at least one current client privilege level that is assigned to the at least one target client network account. In an embodiment, LLM privacy protection tool module 302 may perform step S410 by searching a client network account privilege repository for at least one entry that corresponds to the at least one target client network account. In the embodiment, the client network account privilege repository may be hosted locally or on a database, such as network accounts & entitlements database(s) 206(1), for example. In an additional or alternative embodiment, step S410 may be performed by determining a privilege level based on known and/or consumed information, which may comprise an entitlements database and/or other LLM information.

Also, in the embodiment, step S410 may additionally include: locating, within the client network account privilege repository, the at least one entry; and identifying the at least one current client privilege level from the at least one entry. Moreover, in the embodiment, the at least one current client privilege level may comprise at least one corresponding set of entitlements that permit clients to receive sensitive information that have a degree of sensitivity that is identified by the at least one corresponding set of entitlements.

At step S412, LLM privacy protection tool module 302 evaluates the at least one client query textual response against a data sensitivity taxonomy to determine whether the at least one client query textual response includes a set of sensitive information. For the purposes of this disclosure, sensitive information refers to information that is subject to at least one confidentiality requirement due to at least one from among a law, regulation, policy, rule, agreement, relationship, etc.

In an embodiment, LLM privacy protection tool module 302 may perform step S412 by utilizing at least one artificial intelligence and machine learning (AI/ML) model to determine whether the at least one client query textual response includes the set of sensitive information. In the embodiment, various types of sensitive data may have been utilized to train the at least one AI/ML model to identify, classify, and score the sensitive data. Additionally, in the embodiment, the data sensitivity taxonomy may have been generated by the at least one AI/ML model as a set of classifications of the various types of sensitive data on which the at least one AI/ML model has been trained.

After step S412, LLM privacy protection tool module 302 generates a result of the evaluation of the at least one client query textual response. In an embodiment, the result of this evaluation may comprise at least one from among an identification of the set of sensitive information, a set of respectively corresponding locations of the sensitive information, and a set of respectively corresponding sensitivities.

At step S414, LLM privacy protection tool module 302 redacts the at least one client query textual response according to the result of the evaluation and the at least one current client privilege level. In an embodiment, LLM privacy protection tool module 302 may utilize the at least one AI/ML model to perform step S414. In an additional or alternative embodiment, step S414 may comprise: utilizing the result of the evaluation, and the at least one current client privilege level, to determine at least one redaction to be made to the at least one client query textual response; and making the at least one redaction to the at least one client query textual response.

In yet a further embodiment, at step S414, LLM privacy protection tool module 302 may make the at least one redaction to the at least one client query textual response by performing at least one operation from among: data augmentation, attribute suppression, token masking, pseudonymization, generalization, swapping, data perturbation, synthetic data generation, data aggregation, and add random noise.

At step S416, LLM privacy protection tool module 302 transmits a result of the redacting that has been performed at step S414 to at least one client device that has been associated with the at least one target client network account. After step S416, process 400 may either end or return to step S404 and have LLM privacy protection tool module 302 monitor the at least one LLM for at least one subsequent client query textual response either indefinitely or for a predetermined amount of iterations.

LLM privacy protection tool module 302 may also provide retrieval augmentation generation (RAG) functionality. In an embodiment, both user specific information and the natural data of an LLM may be required to create prompts that facilitate identification of appropriate entitlement(s). Therefore, RAG may be utilized to construct any prompts that need to be transmitted into the LLM to ensure that a specific context of interest (with respect to entitlements) is retrieved. In the embodiment, an output of the LLM may contain personally identifiable identification (PII) sensitive information along with any identified entitlement(s) that will be utilized by to perform a redaction, which may include a replacement.

In an embodiment, prompts may be constructed with user specific data and natural data of an LLM by performing the following operations: generate chunks for uploaded document (user specific information) in a knowledge library with RAG functionality; generate chunks from LLM an embedding model; combining these "chunks" with an embedding that is generated from a user query and/or prompt to construct prompt; retrieve relevant documents (user uploaded documents); utilize the retrieved relevant documents as context for a prompt and a question; and transmit the context, prompt and question to the LLM; and receive a generated response to the context, prompt and question, from the LLM. In addition, the LLM may also be configured with a feedback loop that may fine-tune the LLM.

LLM privacy protection tool module 302 may also provide redaction with meaningful replacement. In an exemplary embodiment, an LLM may classify information as sensitive. In response to such classification, the sensitive information may be replaced by masking and/or hashing the sensitive information, which may result in a heavily redacted and thus unusable output. In a further embodiment, such redaction may be performed by meaningfully replacing sensitive information. Thereby, in the further embodiment, generated model response redactions may further comprise replacing sensitive information with relative and/or statistical responses.

In an exemplary embodiment, an entity of a worker information system (WIS) may be in possession of a recovery strategy in resiliency planning. For the context of a loss-of-site recovery strategy, some entities (e.g., general resiliency manager, plan manager, etc.) are required to query the recovery strategy to determine a level (e.g., a city level or a state level) to which the entity must recover.

In such an exemplary embodiment, other entities (e.g., crisis management entities) that are responsible for incident management may require additional granularity of that data (e.g., recovery strategy, sensitive information, etc.). In addition, that data may need to be exposed down to a street address in order to determine an impact from specific geographic events (e.g., hurricane cone of projection, wildfire maps, etc.). Furthermore, an additional entity type (e.g., an audit or controls manager) may be required to be in possession of a recovery strategy of remote work and a "remote" location exists to stratify the entity's inquiry. However, the additional entity may not be required to be in possession of a location of recovery.

LLM privacy protection tool module 302 may be utilized to determine a relevant role of an entity that queries an LLM as explained in the exemplary embodiment(s) above. LLM privacy protection tool module 302 may utilize the entity's relevant role to determine a level of granularity for a response to the entity's query. The level of granularity for the response may be based on an entitlement and may ensure that PII or other sensitive information is redacted with replacement.

In an exemplary embodiment, a prompt may ask: "to where an entity recovers". If an audit or controls management entity makes such an inquiry, LLM privacy protection tool module 302 may provide a redacted output that replaces sensitive information with either of the following generic phrases: "The entity recovers to an appropriate remote work location"; or "The entity recovers to a remote location within the United States." In this manner, LLM privacy protection tool module 302 may apply any entitlement(s) and replace any information that is appropriate. If a crises manager entity's prompt asks "to where does this entity recovers", then a redaction that includes a replacement may be performed by utilizing the phrase "The entity recovers to somewhere in Koontz Lane."

It should be noted that although the present disclosure describes LLM services and their textual responses, the teachings disclosed herein are also applicable to other forms of GPT technology, such as GPT services that are trained on audible and/or visual training data and provide audible and/or visual responses, for example. It should be noted that all of the training data mentioned above may be stored within a database, such as sensitive information training data repository 206(2), for example.

Thereby, LLM privacy protection tool module 302 may quickly, efficiently, and dynamically revise at least one LLM service's confidentiality requirements, in response to changing circumstances. LLM privacy protection tool module 302 may comprise a sophisticated AI/ML deep learning model that is trained to perform at least one operation from among classifying PII, providing personalized access control to sensitive information, obfuscating an LLM service's output(s), etc.

Accordingly, the herein-disclosed technology eliminates the need to retrain or fine-tune an AI/ML model and thus the need to obtain access to or modify the training data utilized to train the AI/ML model. The herein-disclosed technology also provides an easy plug-and-play approach to adding and/or removing additional requirements (e.g., confidentiality requirements, directory entries, privilege changes, etc.).

The technology disclosed herein is scalable to a variety of different kinds of cyber-attacks and can handle a diverse array of contexts, data, complexities, and requirements. Finally, not only does the approach disclosed herein improve existing technology as mentioned above, but it also protects AI/ML models without degrading their performance and without any architectural changes to the models themselves.

Although the present invention has been described with reference to privacy attacks, it is understood that the present invention may also utilized to address other issues with existing AI/ML technology as well. For example, the present invention may be utilized to rectify existing drawbacks of AI/ML technology such as hallucinations, toxic content and/or irrelevant information by having the at least one AI/ML model (and/or another at least one AI/ML model) that is instead (or additionally) trained to identify, classify, and score at least one from among hallucinatory data, toxic data and/or irrelevant data. In such embodiments, the present invention may evaluate at least one LLM service's response(s) in order to first determine whether at least one such response includes the at least one from among hallucinatory data, toxic data and/or irrelevant data, then redact any such hallucinatory data, toxic data and/or irrelevant data accordingly.

There are multiple techniques for detecting hallucinations, toxic content, etc., such as chain of verification using LLM, fact checking by document search or building AI/ML model for the same, for example. Most of these techniques require a large amount of training data (labelled samples) to train and build an AI/ML model that can utilize the techniques to suppress irrelevant content for a particular application.

In an embodiment, the following approach may be utilized to suppress irrelevant content. An AI/ML model (e.g., a classifier, prompting techniques, fact checking based on available information or chain of verification) may identify such content. The output of this identification may be a triplet (location in the generated response, nature of content, criticality on a scale of 1-5).

In such an embodiment, if designated as highly critical (ranging from 4-5 on a scale of 1-5), the entire output may be discarded, and the querying entity may be asked to rephrase their query with more context. However, if designated as low-moderately critical, the response may be output with an appropriate disclaimer, and the querying entity may be presented with follow-up questions which may be utilized to validate the response.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for securing a large language model (LLM) service against LLM privacy attacks, the method comprising:

interfacing a processor with, and as an intermediary between, each output of the LLM service and each client network of the LLM service, wherein each output of the LLM service provides textual responses to client queries;

monitoring, via the processor, each output of the LLM to detect at least one client query textual response;

detecting, by the processor, the at least one client query textual response from at least one output of the LLM service;

determining, via the processor, at least one target client network account to which the at least one client query textual response is directed;

utilizing, via the processor, retrieval augmentation generation functionality to construct a prompt that obtains, from the LLM service, at least one current client privilege level that is assigned to the at least one target client network account;

evaluating, via the processor, the at least one client query textual response against a data sensitivity taxonomy to determine whether the at least one client query textual response includes a set of sensitive information;

redacting, via the processor, the at least one client query textual response according to a result of the evaluating and the at least one current client privilege level, wherein the redacting comprises replacing the set of sensitive information with at least one statistical response; and transmitting, by the processor, a result of the redacting to at least one client device that has been associated with the at least one target client network account.

2. The method of claim 1, wherein the determining the at least one target client network account comprises:

analyzing, via the processor, the at least one client query textual response to identify at least one respective indication of the at least one target client network account, wherein the at least one respective indication comprises at least one from among a client network account identifier, a token of a client network account, and a client network address;

comparing, by the processor, the at least one respective indication against a corresponding index of client network accounts; and respectively matching, via the processor and based on the comparing, the at least one respective indication with the at least one target client network account.

3. The method of claim 1, wherein the utilizing retrieval augmentation generation functionality, comprises:

searching, by the processor, a client network account privilege repository for at least one entry that corresponds to the at least one target client network account;

locating, via the processor and within the client network account privilege repository, the at least one entry; and identifying, via the processor, the at least one current client privilege level from the at least one entry.

4. The method of claim 1, wherein the at least one current client privilege level comprises at least one corresponding set of entitlements that permit clients to receive sensitive information that have a degree of sensitivity that is identified by the at least one corresponding set of entitlements.

5. The method of claim 1, wherein the evaluating comprises:

utilizing, by the processor, an artificial intelligence and machine learning (AI/ML) model to determine whether the at least one client query textual response includes the set of sensitive information, wherein various types of sensitive data have been utilized to train the AJ/ML model to identify, classify, and score the sensitive data.

6. The method of claim 5, wherein the data sensitivity taxonomy has been generated by the AI/ML model as a set of classifications of the various types of sensitive data on which the AI/ML model has been trained.

7. The method of claim 5, wherein the redacting comprises:

utilizing, by the processor, the AI/ML model to generate the result of the redacting.

8. The method of claim 1, wherein the result of the evaluating comprises at least one from among: an identification of the set of sensitive information, a set of respectively corresponding locations of the sensitive information, and a set of respectively corresponding sensitivities.

9. The method of claim 1, wherein the redacting comprises:

utilizing, by the processor, the result of the evaluating, and the at least one current client privilege level, to determine at least one redaction to be made to the at least one client query textual response; and making, by the processor, the least one redaction to the at least one client query textual response.

10. The method of claim 9, wherein the making the redaction comprises performing, via the processor, at least one from among: data augmentation, attribute suppression, token masking, pseudonymization, generalization, swapping, data perturbation, synthetic data generation, data aggregation, and add random noise.

11. A system for securing a large language model (LLM) service against LLM privacy attacks, the system comprising:

a processor; and memory storing instructions that, when executed by the processor, cause the processor to perform operations that include:

interfacing with, and as an intermediary between, each output of the LLM service and each client network of the LLM service, wherein each output of the LLM service provides textual responses to client queries;

monitoring each output of the LLM to detect at least one client query textual response;

detecting the at least one client query textual response from at least one output of the LLM service;

determining at least one target client network account to which the at least one client query textual response is directed;

utilizing retrieval augmentation generation functionality to construct a prompt that obtains, from the LLM service, at least one current client privilege level that is assigned to the at least one target client network account;

evaluating the at least one client query textual response against a data sensitivity taxonomy to determine whether the at least one client query textual response includes a set of sensitive information;

redacting the at least one client query textual response according to a result of the evaluating and the at least one current client privilege level, wherein the redacting comprises replacing the set of sensitive information with at least one statistical response; and transmitting a result of the redacting to at least one client device that has been associated with the at least one target client network account.

12. The system of claim 11, wherein when the instructions are executed by the processor, the determining the at least one target client network account comprises:

analyzing the at least one client query textual response to identify at least one respective indication of the at least one target client network account, wherein the at least one respective indication comprises at least one from among a client network account identifier, a token of a client network account, and a client network address;

comparing the at least one respective indication against a corresponding index of client network accounts; and respectively matching, based on the comparing, the at least one respective indication with the at least one target client network account.

13. The system of claim 11, wherein when the instructions are executed by the processor, the utilizing retrieval augmentation generation functionality, comprises:

searching a client network account privilege repository for at least one entry that corresponds to the at least one target client network account;

locating within the client network account privilege repository, the at least one entry; and identifying the at least one current client privilege level from the at least one entry.

14. The system of claim 11, wherein when the instructions are executed by the processor, the at least one current client privilege level comprises at least one corresponding set of entitlements that permit clients to receive sensitive information that have a degree of sensitivity that is identified by the at least one corresponding set of entitlements.

15. The system of claim 11, wherein when the instructions are executed by the processor, the result of the evaluating comprises at least one from among: an identification of the set of sensitive information, a set of respectively corresponding locations of the sensitive information, and a set of respectively corresponding sensitivities.

16. The system of claim 11, wherein when the instructions are executed by the processor, the redacting comprises:

utilizing the result of the evaluating, and the at least one current client privilege level, to determine at least one redaction to be made to the at least one client query textual response; and making the least one redaction to the at least one client query textual response.

17. A non-transitory computer-readable medium for securing a large language model (LLM) service against LLM privacy attacks, the computer-readable medium comprising instructions that, when executed by a processor, cause the processor to perform operations that include:

interfacing with, and as an intermediary between, each output of the LLM service and each client network of the LLM service, wherein each output of the LLM service provides textual responses to client queries;

monitoring each output of the LLM to detect at least one client query textual response;

detecting the at least one client query textual response from at least one output of the LLM service;

determining at least one target client network account to which the at least one client query textual response is directed;

utilizing retrieval augmentation generation functionality to construct a prompt that obtains, from the LLM service, at least one current client privilege level that is assigned to the at least one target client network account;

evaluating the at least one client query textual response against a data sensitivity taxonomy to determine whether the at least one client query textual response includes a set of sensitive information;

redacting the at least one client query textual response according to a result of the evaluating and the at least one current client privilege level, wherein the redacting comprises replacing the set of sensitive information with at least one statistical response; and transmitting a result of the redacting to at least one client device that has been associated with the at least one target client network account.

18. The computer-readable medium of claim 17, wherein when the instructions are executed by the processor, the evaluating comprises:

utilizing an artificial intelligence and machine learning (AI/ML) model to determine whether the at least one client query textual response includes the set of sensitive information, wherein various types of sensitive data have been utilized to train the AI/ML model to identify, classify, and score the sensitive data.

19. The computer-readable medium of claim 18, wherein when the instructions are executed by the processor, the redacting comprises:

utilizing the AI/ML model to generate the result of the redacting.

20. The computer-readable medium of claim 17, wherein when the instructions are executed by the processor, the result of the evaluating comprises at least one from among: an identification of the set of sensitive information, a set of respectively corresponding locations of the sensitive information, and a set of respectively corresponding sensitivities.

* * * * *